United States Patent
Paetzold et al.

(10) Patent No.: US 7,803,342 B2
(45) Date of Patent: Sep. 28, 2010

(54) PROCESS FOR RECYCLING HIGH-BOILING COMPOUNDS WITHIN AN INTEGRATED CHLOROSILANE SYSTEM

(75) Inventors: Uwe Paetzold, Burghausen (DE); Markus Niemetz, St. Radegund (AT)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 12/281,551

(22) PCT Filed: Feb. 21, 2007

(86) PCT No.: PCT/EP2007/051665

§ 371 (c)(1), (2), (4) Date: Sep. 3, 2008

(87) PCT Pub. No.: WO2007/101790

PCT Pub. Date: Sep. 13, 2007

(65) Prior Publication Data

US 2009/0053123 A1 Feb. 26, 2009

(30) Foreign Application Priority Data

Mar. 3, 2006 (DE) .................. 10 2006 009 953

(51) Int. Cl.
C01B 33/12 (2006.01)
(52) U.S. Cl. ...................... 423/336; 423/335
(58) Field of Classification Search ............. 423/336, 423/335
See application file for complete search history.

(56) References Cited

U.S. PATENT DOCUMENTS

| | | | | |
|---|---|---|---|---|
| 4,126,488 A * | 11/1978 | Kunst et al. | .................. | 148/279 |
| 4,196,438 A * | 4/1980 | Carlson | .................. | 257/54 |
| 4,565,682 A | 1/1986 | Loskot et al. | | |
| 4,801,415 A * | 1/1989 | Hughes | .................. | 264/120 |
| 4,842,839 A * | 6/1989 | Rau | .................. | 423/342 |
| 5,118,485 A * | 6/1992 | Arvidson et al. | .................. | 423/342 |
| 5,785,941 A | 7/1998 | Maginot et al. | | |
| 6,322,765 B1 | 11/2001 | Muehlhofer et al. | | |
| 6,733,893 B2 * | 5/2004 | Suzuki et al. | .................. | 428/447 |
| 6,800,413 B2 * | 10/2004 | Barthel et al. | .................. | 430/108.3 |
| 6,846,473 B2 | 1/2005 | Kirii et al. | | |
| 6,905,576 B1 * | 6/2005 | Block et al. | .................. | 203/29 |
| 6,932,953 B2 * | 8/2005 | Nishimine et al. | .................. | 423/337 |
| 7,118,653 B2 * | 10/2006 | Brady et al. | .................. | 203/29 |
| 7,485,160 B2 * | 2/2009 | Kitada | .................. | 48/61 |
| 2002/0048063 A1 | 4/2002 | Jung et al. | | |
| 2002/0187096 A1 | 12/2002 | Kendig et al. | | |

FOREIGN PATENT DOCUMENTS

| | | |
|---|---|---|
| DE | 2909815 A | 9/1980 |
| DE | 3024319 A | 1/1982 |
| DE | 2620737 C2 | 7/1982 |
| DE | 3503262 A | 8/1986 |
| DE | 3712125 A | 10/1988 |
| EP | 0706972 A | 4/1996 |
| EP | 0790213 A | 8/1997 |
| GB | 2049641 A | 12/1980 |
| JP | 01188414 A | 7/1989 |
| JP | 09263405 A | 10/1997 |

OTHER PUBLICATIONS

Von Sirtl, Erhard et al., "Ueber die Reduktion von Chlorsilanen mit Wasserstoff," Z. anorg. allg. Chemie, Bd. 332, 1964, pp. 113-123 (in German).
Sirtl, E. et al., "High Temperature Reactions in the Silicon-Hydrogen-Chlorine System," J. Electrochem., Soc. 121, 1984, pp. 919-925.

* cited by examiner

Primary Examiner—Timothy C Vanoy
Assistant Examiner—Michelle Hou
(74) Attorney, Agent, or Firm—Brooks Kushman P.C.

(57) ABSTRACT

Highly pure pyrogenic silica is produced in an integrated polycrystalline silicon production plant by separating offgas from polycrystalline silicon production into a high boiler fraction, vaporizing this fraction into a pyrogenic silica burner and reacting with air and/or oxygen and hydrogen to form pyrogenic silica.

15 Claims, No Drawings

PROCESS FOR RECYCLING HIGH-BOILING COMPOUNDS WITHIN AN INTEGRATED CHLOROSILANE SYSTEM

CROSS-REFERENCE TO RELATED APPLICATION

This application is the U.S. national phase of PCT Appln. No. PCT/EP2007/051665 filed Feb. 21, 2007 which claims priority to German application DE 10 2006 009 953.2 filed Mar. 3, 2006.

BACKGROUND OF THE INVENTION

1. Field of the Invention

The invention relates to a method of reutilizing high-boiling compounds within an integrated chlorosilane plant for the production of semiconductor silicon comprising trichlorosilane production, Si deposition and the production of finely divided silica.

2. Description of the Related Art

In an integrated plant for producing semiconductor silicon, trichlorosilane as crude silane is produced either from metallurgical silicon and HCl or from metallurgical silicon and $SiCl_4/H_2$ in a fluidized-bed reactor. The crude silane is subsequently purified by means of distillation/purification to give trichlorosilane. Polycrystalline silicon is deposited from the purified trichlorosilane, which results in formation of, inter alia, $SiCl_4$. The utilization of the $SiCl_4$ (e.g. hydrogenation to form trichlorosilane or combustion to produce finely divided silica or silicic esters) is known from the prior art. The deposition of polycrystalline silicon from a mixture of chlorosilanes, in particular trichlorosilane, and hydrogen, forms not only $SiCl_4$ but also a fraction comprising high-boiling chlorosilanes (Sirtl, J. ELECTROCHEM. SOC. 121 (1974) 919; Sirtl, Z. ANORG. ALLG CHEMIE 332 (1964) 113; Göppinger DE3024319). The term "high-boiling chlorosilanes" here refers to compounds which consist of silicon, chlorine, and also possibly hydrogen, oxygen and carbon, and have a boiling point higher than that of tetrachlorosilane (57° C./at 1013 hPa). These compounds are preferably disilanes $H_nCl_{6-n}Si_2$ (n=0-4) and higher oligo(chloro)silanes which preferably have from 2 to 4 Si atoms and also disiloxanes $H_nCl_{6-n}Si_2O$ (n=0-4) and higher siloxanes which preferably have from 2 to 4 Si atoms, including the cyclic oligosiloxanes and their methyl derivatives. This fraction will hereinafter also be referred to as high boiler fraction.

Thus, the offgas from the Si deposition reactors comprises dichlorosilane, trichlorosilane and silicon tetrachloride together with amounts (0.001-2% by weight) which vary as a function of the deposition conditions of high-boiling chlorosilanes. In a typical composition, these high-boiling chlorosilanes comprise, for example, 50% by weight of $Si_2Cl_6$, >35% by weight of $Si_2HCl_5$, 10% by weight of $Si_2H_2Cl_4$ (2 isomers), 5% by weight of $Si_2H_3Cl_3$ (2 isomers) and <1% by weight of higher silanes (for example $Si_3Cl_8$).

The offgases from the deposition of polycrystalline silicon can be recycled virtually in their entirety for the production of polycrystalline silicon. The offgases are condensed and subsequently distilled. Here, the low boiler fraction, which comprises silanes having a boiling point of <40° C. under atmospheric conditions (1013 hPa) (e.g. monochlorosilane, dichlorosilane and trichlorosilane), is separated by distillation from the higher-boiling chlorosilanes and reused for the deposition of Si. Silicon tetrachloride is partly separated by distillation from the remaining mixture of silicon tetrachloride and the high-boiling chlorosilanes and is, for example, converted by hydrogenation into trichlorosilane which is in turn used in the deposition of Si. The mixture of silicon tetrachloride and the now somewhat concentrated high-boiling chlorosilanes which remains as a residue can be processed further by various methods. This high boiler fraction consists virtually entirely of disilanes (hexachlorodisilane, pentachlorodisilane, tetrachlorodisilane and trichlorodisilane) and oligosilanes (trisilanes and tetrasilanes). Due to the high purity of this fraction, it is possible to pass it to an economically beneficial use.

Thus, U.S. Pat. No. 6,846,473 describes a process for the chlorination of this high-boiling fraction with subsequent isolation of $Si_2Cl_6$ for use for semiconductor purposes.

It is also known that this high boiler fraction can be subjected to the further processing steps mentioned below to give a recyclable trichlorosilane and silicon tetrachloride. Thus, JP1-188414 (Yoshitomi, Oomure Osaka Titanium Co., Ltd. 1988) describes the recirculation of this fraction to the fluidized-bed reactor for preparing trichlorosilane.

Wakamatsu JP09-263405 Tokuyama 1996 describes the cleavage of the disilanes which have been obtained from the deposition of Si by means of HCl over activated carbon at elevated temperature.

The reaction of this high boiler fraction with silicon tetrachloride and hydrogen in a high-temperature reactor is described in US2002/0187096 (Kendig, Landis, McQuiston Dow Corning 2001).

A further possibility of cleaving these high boilers over N or P bases is described in DE3503262.

In all these processes, the high boilers are cleaved by means of hydrogen and/or HCl in order to obtain trichlorosilane and silicon tetrachloride from them. These processes in each case involve a large engineering outlay for the additional process steps.

The preparation of $SiO_2$ powders by flame pyrolysis is known, for example, from DE2620737 and EP790213. The starting material for the silicon dioxide powder is generally silicon tetrachloride. Apart from silicon tetrachloride, methyltrichlorosilane, trichlorosilane or mixtures of these with silicon tetrachloride are also employed. Chlorine-free silanes or siloxanes can also be used. According to EP790213, the use of dimeric chlorosilanes and siloxanes is also possible.

SUMMARY OF THE INVENTION

It is an object of the present invention to provide an economical method of utilizing the high-boiling chlorosilanes from the offgases from the deposition of polycrystalline silicon from chlorosilanes and hydrogen. In contrast to the previously known processes for utilizing these high boilers, this should be achieved within an existing integrated chlorosilane plant without an additional outlay in terms of apparatus. These and other objects are achieved by a process for preparing pyrogenic silica, which is characterized in that the offgas from the deposition of polycrystalline silicon from chlorosilane and hydrogen is condensed and subsequently fractionated in a distillation column, with the bottom product from this distillation column being a high boiler fraction comprising 0.5-20% by weight of high-boiling chlorosilanes and 99.5-80% by weight of silicon tetrachloride and this high boiler fraction being completely evaporated and the chlorosilane vapor being fed to a burner and there reacted with air or oxygen, and with hydrogen in a flame to give pyrogenic silica.

DETAILED DESCRIPTION OF THE PREFERRED EMBODIMENTS

The process of the invention makes possible a solution for utilizing the high-boiling silanes obtained in the offgas from the deposition of polycrystalline silicon (high boilers) which is simple in terms of apparatus since the apparatuses for the preparation of pyrogenic silica are generally already present in an integrated chlorosilane plant in order to utilize excess silicon tetrachloride.

In the first step, the offgas from the deposition of polycrystalline silicon is fractionated in a distillation column to produce three fractions. Here, the fraction containing dichlorosilane and trichlorosilane (boiling point of this fraction: <40° C.) is distilled off at the top of the column and recycled for reuse in the deposition of polycrystalline silicon. The second fraction is taken off from the side offtake of the column. It comprises virtually pure silicon tetrachloride (boiling point: 57° C.) having a trichlorosilane content and high boiler content of in each case <0.01%. The semiconductor-purity STC obtained here can either be used for CVD processes in the semiconductor industry or is hydrogenated again to form trichlorosilane or is used in the preparation of pyrogenic silica. The bottom product from this distillation column contains, depending on the way in which the column is operated, 0.5-20%, by weight of high-boiling chlorosilanes, with the balance being silicon tetrachloride (high boiler fraction).

This high boiler fraction is eminently suitable for the preparation of pyrogenic silica, since the metal content (<10 ppbw for each individual metal) and the boron content (<10 ppbw) are each very low.

In a variant of the process of the invention, the high boiler fraction is distilled again in a downstream distillation step in order to separate off further silicon tetrachloride before the high boilers are vaporized and passed to combustion. The high-boiling chlorosilanes can be concentrated to up to 50% by weight in this step.

To set a defined hydrogen content in the high boiler fraction for the preparation of pyrogenic silica, the high boiler fraction is preferably reacted with chlorine before it is vaporized and passed to combustion. For this purpose, the content of SiH compounds in the high boiler fraction is determined, an amount of chlorine calculated therefrom is added to the high boiler fraction and the H content of the high boiler fraction is thereby reduced before the high boiler fraction is vaporized and passed to combustion. This step is preferably carried out under UV irradiation.

The preparation of the silica is carried out in the manner known from the prior art using the abovementioned fraction containing high boilers instead of tetrachlorosilane. The fraction containing high boilers is completely vaporized, the chlorosilane vapor is mixed with air or an oxygen-containing gas mixture and also hydrogen and subsequently fed to a reactor in which the gas mixture is reacted in a flame to give pyrogenic silica. The gases can likewise be fed separately into the flame.

The mixing ratio of chlorosilane vapor to air or an oxygen-containing gas mixture is preferably in the range from 0.06 to 0.18 and that to hydrogen is preferably in the range from 0.25 to 0.60 (volume ratio).

The solid silicon oxide powder which has been separated off from the gas stream is preferably subjected to after-purification by means of heated air or air enriched with water.

The use of the high boiler fraction mentioned for preparing a silicon dioxide powder has been found to be advantageous since the high boiler fraction can be processed to give a product of value (pyrogenic silica) in the existing apparatuses of an integrated chlorosilane plant without an additional outlay in terms of apparatus. This mode of operation produces no wastes which would pollute the environment. Apart from the abovementioned advantages for the economical optimization of the production of polycrystalline silicon, it has been found that the greater energy content of the compounds leads to the amount of fuel which has to be used in the preparation of silicon dioxide being reduced by 10-40%. In addition, an $SiO_2$ powder which is particularly low in metals and boron is produced in this way.

The invention therefore also provides a pyrogenic silica which is characterized in that it has a specific surface area of 5-600 $m^2/g$, a pH of 3.8-4.5, a boron content of less than 2 ppm, preferably less than 1.5 ppm, and a total content of the trace metals iron, nickel, chromium, copper and zinc of less than 5 ppm, preferably less than 0.5 ppm.

A low boron content of less than 4 ppm in the silicon dioxide powder is advantageous for numerous applications. Such a silica can be used advantageously for dispersions, in particular for chemomechanical polishing in the semiconductor industry.

The following examples serve to illustrate the invention. In the examples, the specific surface area of the silica was determined by absorption of nitrogen in accordance with DIN 66131/66132. The measurement of the pH is carried out in a 4% strength aqueous dispersion using a method based on DIN ISO 787/9. The boron content was determined by digesting 5 g of silicon oxide powder in hydrofluoric acid. After taking up the digestion mixture in nitric acid, the boron content of the solution obtained is determined by means of ICP-AES (inductively coupled plasma atomic emission spectroscopy).

The following examples illustrate the invention.

EXAMPLE 1

Comparative Example

Pure silicon tetrachloride was vaporized at about 160° C., mixed with air and hydrogen in a ratio of 0.1 and 0.5, respectively, and burnt in a reactor known from the patent DE2620737C2 to give finely divided silicon dioxide.

Silicon dioxide having a BET surface area of 199 $m^2/g$ and a pH of 4.13 was obtained in the reaction. The boron content of the $SiO_2$ powder was 2.2 ppm.

EXAMPLE 2

A chlorosilane mixture (comprising monochlorosilane, dichlorosilane, trichlorosilane and tetrachlorosilane together with <0.5% by weight of high boilers) obtained from the deposition of Si is distilled in a distillation column in order to separate off MCS, dichlorosilane and trichlorosilane which is recycled to the deposition of Si. The bottom product contains 0.5-2% by weight of high boilers in silicon tetrachloride.

This mixture was used for the preparation of pyrogenic silica as describes in example 1 except that the abovementioned bottom product was used instead of silicon tetrachloride. The $SiO_2$ powder obtained had a BET surface area of 201 $m^2/g$ and a pH of 4.16. The boron content was <1.5 ppm.

EXAMPLE 3

The bottom product from example 2) was distilled in a distillation column to give a chlorosilane mixture having a content of about 25% by weight of high boilers. This chlorosilane mixture was used in a manner analogous to example 2 for the preparation of pyrogenic silica.

The $SiO_2$ powder obtained had a BET surface area of 198 $m^2/g$ and a pH of 4.15. The boron content was <1 ppm.

EXAMPLE 4

The bottom product from example 2) was analyzed by means of GC to determine the content of Si—H compounds. The amount of chlorine required for complete chlorination of the Si—H groups was determined therefrom. This product was reacted with 1.1 mol of chlorine per mole of Si—H under irradiation with a mercury vapor lamp in order to convert Si—H compounds into Si—Cl compounds and subsequently distilled. The bottom product obtained now contained about 25% of $Si_2Cl_6$ and only traces in the ppm range of Si—H compounds. This product was converted in a manner analogous to example 2 into $SiO_2$. The $SiO_2$ powder obtained had a BET surface area of 204 $m^2/g$ and a pH of 4.11. The boron content was <1.5 ppm.

The invention claimed is:

1. A process for preparing pyrogenic silica, comprising condensing the offgas from deposition of polycrystalline silicon from chlorosilane and hydrogen to form a condensed offgas fraction; fractionating the condensed offgas fraction in a distillation column, with a bottom fraction from the distillation column comprising a high boiler fraction containing 0.5-20% by weight of high-boiling chlorosilanes and 99.5-80% by weight of silicon tetrachloride, and evaporating at least a portion of the high boiler fraction to form a chlorosilane vapor, and feeding chlorosilane vapor thus obtained to a burner and reacting with air or oxygen and with hydrogen in a flame to give pyrogenic silica, and collecting the pyrogenic silica as a finely divided silica powder.

2. The process of claim 1, wherein the high boiler fraction is distilled again in a downstream distillation step to separate further silicon tetrachloride before the high boilers are vaporized and fed to the burner.

3. The process of claim 2, wherein the high boiler fraction is reacted with chlorine before it is vaporized and fed to the burner.

4. The process of claim 3, wherein the reaction with chlorine is carried out under UV irradiation.

5. The process of claim 1, wherein the high boiler fraction is reacted with chlorine before it is vaporized and fed to the burner.

6. The process of claim 5, wherein the reaction with chlorine is carried out under UV irradiation.

7. The process of claim 1, wherein chlorosilane vapor and air or an oxygen-containing gas mixture are present in the burner in a volume ratio of from 0.06 to 0.18 and chlorosilane vapor and hydrogen are present in a volume ratio of from 0.25 to 0.60.

8. A pyrogenic silica produced by the process of claim 1, which has a specific surface area of 5-600 $m^2/g$, a pH of 3.8-4.5 and a boron content of less than 2 ppm.

9. The pyrogenic silica of claim 8, which has a boron content of less than 1.5 ppm and a total content of the trace metals iron, nickel, chromium, copper and zinc of less than 5 ppm.

10. The pyrogenic silica of claim 9, which has a total content of the trace metals iron, nickel, chromium, copper, and zinc of less than 0.5 ppm.

11. The process of claim 1, wherein the finely divided silica powder has a specific surface area of 5-600 $m^2/g$.

12. The process of claim 1, wherein the finely divided silica powder has a pH of 3.8-4.5.

13. The process of claim 1, wherein the finely divided silica powder has a boron content of less than 2 ppm.

14. The process of claim 1, wherein the finely divided silica powder has a specific surface area of about 200 $m^2/g$.

15. The process of claim 14, wherein the finely divided silica powder has a pH of from 3.8 to 4.5.

* * * * *